(12) United States Patent
Trim et al.

(10) Patent No.: US 11,475,296 B2
(45) Date of Patent: Oct. 18, 2022

(54) LINEAR MODELING OF QUALITY ASSURANCE VARIABLES

(71) Applicant: International Business Machines Corporation, Armonk, NY (US)

(72) Inventors: Craig M. Trim, Ventura, CA (US); Martin G. Keen, Cary, NC (US); Michael Bender, Rye Brook, NY (US); Aaron K. Baughman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 16/424,654

(22) Filed: May 29, 2019

(65) Prior Publication Data

US 2020/0380352 A1 Dec. 3, 2020

(51) Int. Cl.
*G06N 3/08* (2006.01)
*G06N 3/04* (2006.01)

(52) U.S. Cl.
CPC ............. *G06N 3/08* (2013.01); *G06N 3/04* (2013.01)

(58) Field of Classification Search
CPC ........... G06N 3/08; G06N 3/04; G06N 3/0454
See application file for complete search history.

(56) References Cited

U.S. PATENT DOCUMENTS

| | | | |
|---|---|---|---|
| 6,853,920 B2 | 2/2005 | Hsiung et al. | |
| 7,801,839 B2 | 9/2010 | Kates et al. | |
| 2003/0130899 A1 | 7/2003 | Ferguson et al. | |
| 2003/0149603 A1 | 8/2003 | Ferguson | |
| 2008/0279434 A1* | 11/2008 | Cassill | G06Q 10/06 382/131 |
| 2009/0070282 A1* | 3/2009 | Harrison | G06N 3/02 706/23 |
| 2013/0304567 A1 | 11/2013 | Adrien et al. | |
| 2018/0053401 A1 | 2/2018 | Martin et al. | |
| 2018/0260726 A1 | 9/2018 | Takada et al. | |
| 2018/0284739 A1 | 10/2018 | Ueda et al. | |

(Continued)

FOREIGN PATENT DOCUMENTS

WO    WO-2014145977 A1 *  9/2014    ......... G05B 23/0229

OTHER PUBLICATIONS

Hosseinifard, S., Abdollahian, M., & Zeephongsekul, P. (2011). Application of artificial neural networks in linear profile monitoring. Expert Systems with Applications, 38(5), 4920-4928. doi:10.1016/j.eswa.2010.09.160 (Year: 2011).*

(Continued)

*Primary Examiner* — Brent Johnston Hoover
(74) *Attorney, Agent, or Firm* — Christopher M. Pignato; Isaac J. Gooshaw

(57) ABSTRACT

A neural network system for generating a quality assurance alert is provided. A computing device analyzes a quality assurance profile. A computing device arranges data in neurons of, at least, a first layer of a neural network. A computing device generates a threshold level of prediction of quality assurance based, at least in part, on output data from a neural network. A computing device applies output data from a neural network to a regression profile to determine a probability that a quality assurance issue will occur. A computing device generates a message that includes a quality assurance evaluation based, at least, on the determined probability that the quality assurance issue will occur.

17 Claims, 5 Drawing Sheets

(56) References Cited

U.S. PATENT DOCUMENTS

2018/0285694 A1  10/2018 Kobayashi
2019/0129821 A1* 5/2019 Lee .................. G06F 17/15

OTHER PUBLICATIONS

Jan, T, and A Zaknich. "An Adjustable Model for Linear to Nonlinear Regression." IJCNN'99. International Joint Conference on Neural Networks. Proceedings (Cat. No.99CH36339). vol. 2. IEEE, 1999. 846-850 vol. 2. Web. (Year: 1999).*

Amiri et al., "Phase I monitoring of generalized linear model based regression profiles", Journal of Statistical Computation and Simulation, 85(14), Jul. 2014, 23 pages.

Frost, J., "How to Choose Between Linear and Nonlinear Regression", Statistics By Jim, Accessed on Mar. 25, 2019, 26 pages, <https://statisticsbyjim.com/regression/choose-linear-nonlinear-regression/>.

Hosseinifard et al., "Application of artificial neural networks in linear profile monitoring", Expert Systems with Applications, 38(2011), pp. 4920-4928.

Smaoui et al., "The Determinants of Bond Market Development: Further Evidence from Emerging and Developed Countries", Emerging Markets Review 32, 2017,© 2017 Elsevier B.V , 21 pages.

* cited by examiner

LINEAR MODELING OF QUALITY ASSURANCE VARIABLES

BACKGROUND OF THE INVENTION

The present invention relates generally to the field of neural networks, and more particularly to quality assurance variables of multilayer perceptron neural networks.

Neural networks are computing systems that learn from data to perform tasks. In addition, neural networks include multilayer perceptron, which are a class of feedforward artificial neural networks. Multilayer perceptron consists of, at least, three layers: a first layer, a hidden layer, an output layer. Multilayer perceptron operates under a supervised learning technique of backpropagation for training and is largely utilized to distinguish data that is not linearly separable.

SUMMARY

Embodiments of the present invention provide a method, system, and program product to apply a quality assurance profile to a neural network and generating a regression profile utilizing the output data from the neural network.

A first embodiment encompasses a method for applying a quality assurance profile to a neural network and generating a regression profile utilizing the output data from the neural network. One or more processors analyze a quality assurance profile. The one or more processors arrange data in neurons of, at least, a first layer of a neural network. The one or more processors generate a threshold level of prediction of quality assurance. The one or more processors apply output data from a neural network to a regression profile to determine a probability that a quality assurance issue will occur. The one or more processors generate a message that includes a quality assurance evaluation based, at least, on the determined probability that the quality assurance issue will occur.

A second embodiment encompasses a computer program product for applying a quality assurance profile to a neural network and generating a regression profile utilizing the output data from the neural network. The computer program product includes one or more computer-readable storage media and program instructions stored on the one or more computer-readable storage media. The program instructions include program instructions to analyze a quality assurance profile. The program instructions include program instructions to arrange data in neurons of, at least, a first layer of a neural network. The program instructions include program instructions to generate a threshold level of prediction of quality assurance. The program instructions include program instructions to apply output data from a neural network to a regression profile to determine a probability that a quality assurance issue will occur. The program instructions include program instructions to generate a message that includes a quality assurance evaluation based, at least, on the determined probability that the quality assurance issue will occur.

A third embodiment encompasses a computer system for executing a neural network search system. The computer system includes one or more computer processors, one or more computer readable storage medium, and program instructions stored on the computer readable storage medium for execution by at least one of the one or more processors. The program instructions include program instructions to analyze a quality assurance profile. The program instructions include program instructions to arrange data in neurons of, at least, a first layer of a neural network. The program instructions include program instructions to generate a threshold level of prediction of quality assurance. The program instructions include program instructions to apply output data from a neural network to a regression profile to determine a probability that a quality assurance issue will occur. The program instructions include program instructions to generate a message that includes a quality assurance evaluation based, at least, on the determined probability that the quality assurance issue will occur.

DETAILED DESCRIPTION

Figure 1:
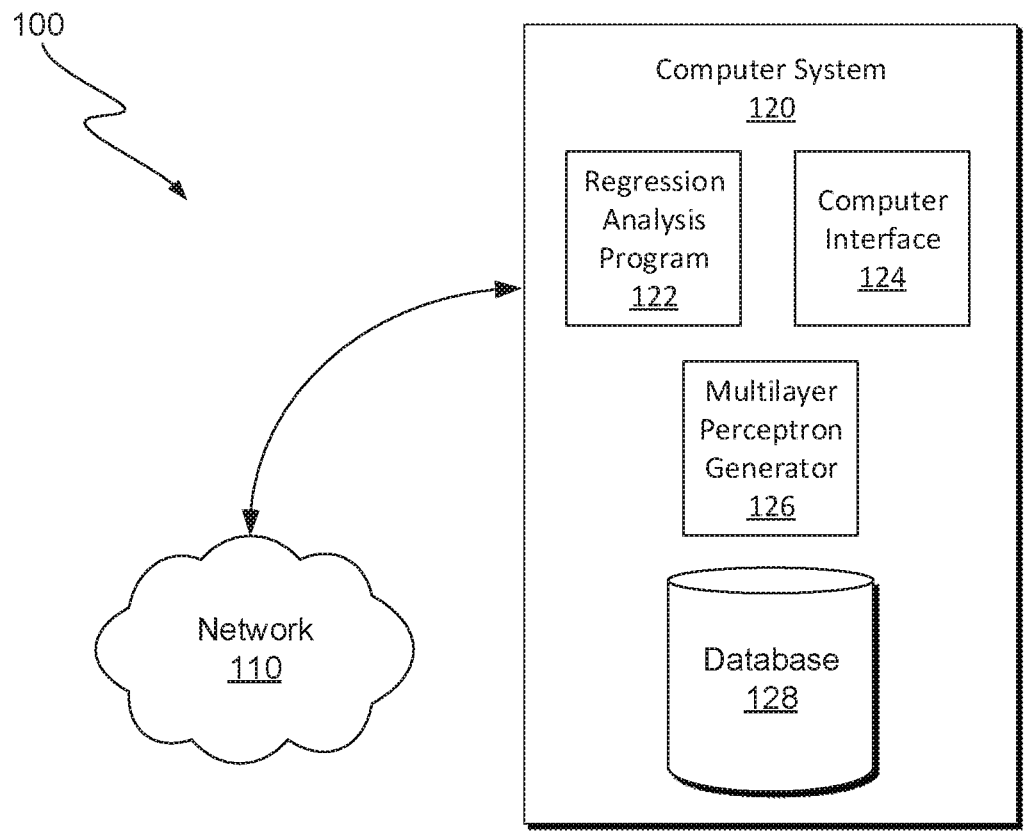
FIG. 1 is a functional block diagram illustrating a computing environment, in which a neural network analyzes a quality assurance profile, in accordance with an exemplary embodiment of the present invention.

In certain quality assurance profiles, machine learning is called on to determine whether a quality assurance issue is precited to occur. Neural networks learn and analyze quality assurance explanatory variables which can be utilized to generate a regression analysis to determine whether a quality assurance issue is forecasted. The neural networks arrange initial input/output (I/O) data in a layered feedforward topology to generate modified I/O data that is based on the weights and thresholds as the free parameters of the quality assurance model.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to quality assurance profiles are known, these solutions may be inadequate to proactively generate an alert when a quality assurance issues occurs. For example, a given solution may fail to proactively generate an alert when a quality assurance issues occurs because that solution only generates reactive alerts to quality assurance profiles, i.e., the solution only generates alerts to existing quality assurance issues. Generally, in machine learning, a weighted model may be preferable to have a high accuracy of prediction, or to have the ability to correctly predict a result of an unknown. If the neural network reactively issues an alert when there is a quality assurance issue, the more catastrophic and overwhelming the quality assurance issue will be. Embodiments of the present invention provide a solution that may proactively issue an alert based on predictions of potential quality assurance issues, i.e., before a given predicted quality assurance issue becomes an actual quality assurance issue. Embodiments of the present invention provide a solution that predicts potential quality assurance issues by analyzing I/O data of current quality assurance response and explanatory variables to generate the predicted, i.e., forecasted, quality assurance issue. In some embodiments, the neural network monitors quality assurance (QA) profiles. In one embodiment, the system analyzes the QA profiles and transmits the analysis data to a neural network that uses the analysis data as a basis to arrange, at least in part, initial I/O data in a layered feedforward topology. In some embodiments, the arrangement of initial I/O in the layered feedforward topology is based, at least in part, on an interpretation of the initial I/O data using the weights and thresholds of the free parameters of the model.

Embodiments of the present invention recognize that neural networks used for quality assurance profiles generally generate I/O data. However, the I/O data may not be predictive but rather a summary of the I/O data collected from the quality assurance profile, and therefore the corresponding I/O data generated by the neural network may not forecast any quality assurance issues. Additionally, neural networks typically populate a computing device with results relating to the data collected from, and/or is generated based on, the quality assurance response and explanatory variables. As such, these and similar system may, in certain circumstances, be ineffective for forecasting quality assurance issues when compared to other solutions. The present invention provides a more effective system for forecasting quality assurance issues based on the quality assurance response and explanatory variables.

Embodiments of the present invention provides: computing device comprising one or more systems to analyze a quality assurance profile that are capable of applying the data of the quality assurance profile to a neural network. The present invention recognizes that by applying the quality assurance profile to a neural network, the data is transformed and produces output data. The output is utilized to generate a regression profile, and based, at least in part, on the output data analyzes the regression profile to determine if a quality assurance issue will occur.

In one embodiment, multilayer perceptron generator 126 operating on computer system 120 receives a quality assurance profile. Multilayer perceptron generator 126 analyzes data on a quality assurance profile. Multilayer perceptron generator 126 arranges data in neurons of, at least, a first layer of a neural network. Multilayer perceptron generator 126 operates to generate a threshold level of prediction of quality assurance based, at least in part, on output data from a neural network. Multilayer perceptron generator 126 applies output data from a neural network to a regression profile to determine a probability that a quality assurance issue will occur. In a second embodiment, a message that includes a quality assurance evaluation based, at least, on the determined probability that the quality assurance issue will occur is generated by regression analysis program 122.

In one embodiment, regression analysis program 122 receives a quality assurance profile. Regression analysis program 122 analyzes the quality assurance profile. Data from the quality assurance profile comprising, at least, (i) one or more response variables and (ii) one or more explanatory variables from the quality assurance profile is identified by regression analysis program 122. Regression analysis program 122 stores the data on a database (i.e., database 128).

In one embodiment, regression analysis program 122 categorizes the data from the quality assurance profile. Regression analysis program 122 analyzes (i) the one or more response variables and (ii) the one or more explanatory variables. Regression analysis program 122 assigns a weight level to one or more neurons based, at least in part, on the one or more corresponding explanatory variables. Regression analysis program 122 determines (i) one or more neurons in, at least, a first layer (ii) one or more corresponding response variables and (iii) one or more corresponding explanatory variables.

In one embodiment, regression analysis program 122 receives net input function data from multilayer perceptron generator 126. Regression analysis program 122 analyzes the net input function data in one or more neurons, at least, in the first layer of a neural network. Regression analysis program 122 determines that input-weight variables form the net input data should pass through, at least, one more layer of a neural network. Regression analysis program 122 applies the input-weight variables to, at least, one more layer of a neural network.

In one embodiment, regression analysis program 122 identifies a plurality of features based, at least in part, on the data from the quality assurance profile. Regression analysis program 122 monitors (i) input and output data of the neural network and (ii) the weight in the neural network. Regression analysis program 122 learns a pattern associated with, at least, the plurality of features. A threshold level of prediction that the quality assurance issue will occur based, at least in part, on an output data from the neural network is generated by regression analysis program 122.

In one embodiment, regression analysis program 122 receives an output data from the neural network. Regression analysis program 122 analyzes the output data. Regression analysis program 122 identifies (i) one or more weighted response variables and (ii) a change in value in one or more explanatory variables. Response to identifying a change in one or more explanatory variables, regression analysis program 122 analyzes the change in value in one or more explanatory variables. Regression analysis program 122 determines whether to apply the output data to (i) a linear regression profile or (ii) a non-linear regression profile based, at least in part, on the change in value in one or more explanatory variables.

In one embodiment, regression analysis program 122 applies output data to a regression profile based, at least in part, on the determination of (i) a linear regression profile or (ii) a non-linear regression profile. A regression profile is generated by regression analysis program 122. Regression analysis program 122 analyzes the regression profile. Regression analysis program 122 determines, based, at least, on a value of the regression profile that a given quality assurance issue will occur. A quality assurance alert is generated by regression analysis program 122 based, at least, on the determination that the given quality assurance issue will occur.

The present invention will now be described in detail with reference to the Figures.

FIG. 1 is a functional block diagram illustrating a computing environment, generally designated 100, in accordance with one embodiment of the present invention. Computing environment 100 includes computer system 120 connected over network 110. Computer system 120 includes regression analysis program 122, computer interface 124, multilayer perceptron generator 126 and database 128.

In various embodiments of the present invention, computer system 120 is a computing device that can be a standalone device, a server, a laptop computer, a tablet computer, a netbook computer, a personal computer (PC), a personal digital assistant (PDA), a smartwatch, a desktop computer, or any programmable electronic device capable of receiving, sending, and processing data. In general, computer system 120 represents any programmable electronic device or combination of programmable electronic devices capable of executing machine readable program instructions and communication with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing regression analysis program 122, computer interface 124 and multilayer perceptron generator 126. Computer system 120 may include internal and external hardware components, as depicted and described in further detail with respect to FIG. 1.

In this exemplary embodiment, regression analysis program 122, computer interface 124, multilayer perceptron generator 126 and database 128 are stored on computer system 120. However, in other embodiments, regression analysis 122, computer interface 124, multilayer perceptron generator 126 and database 128 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120 and various other computer systems (not shown), in accordance with a desired embodiment of the present invention.

Computer system 120 includes computer interface 124, computer interface 124 provides an interface between computer system 120 and various other computer systems (not shown). In some embodiments, computer interface 124 can be a graphical interface (GUI) or a web browser (WUI) and can display text, documents, web browser, windows, user options, application interfaces, and instructions for operation, and includes the information (such as graphic, text, and sound) that a program presents to a user and the control sequences the user employs to control the program. In some embodiments, computer system 120 accesses data communicated from various other computer systems (not shown) via a client-based application that runs on computer system 120. For example, computer system 120 includes mobile application software that provides an interface between computer system 120 and various other computer systems (not shown).

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data, In another embodiment, the various other computer systems represent a computing system utilizing clustered computers and components to act as a single pool of seamless resources. In general, the various other computer systems can be any computing device or combination of devices with access to computer system 120 and network 110 and is capable of executing regression analysis program 122. The various other computer systems may include internal and external hardware components, as depicted and described in further detail with respect to FIG. 1.

In the embodiment depicted in FIG. 1, regression analysis program 122, at least in part, has access to computer interface 124 and multilayer perceptron generator 126 and can communicate data stored on computer system 120 to various computer systems (not shown). More specifically, computer interface 124 defines a user of computer system 120 that has access to data stored on database 128.

In the embodiment depicted in FIG. 1, regression analysis program 122 utilizes, at least in part, the data stored on database 128 to manage access to computer interface 124 in response to a regression analysis request from computer system 120 (i.e., from user of computer system 120, alternatively referred to herein as "requestor"). More specifically, regression analysis program 122 defines one or more responses and explanatory variables that represent the types of I/O data and attributes that constitute a passing grade in a quality assurance (QA) profile. For example, the response variable may be a quality of service metric, and explanatory variables may be a series of Internet of Things (IoT) sensor readings.

Regression analysis program 122, computer interface 124, multilayer perceptron generator 126 and database 128 are depicted in FIG. 1 for illustrative simplicity, computer system 120, however, can include any number of logics and/or programs that are managed in accordance with regression analysis program 122. In general, computer system 120 manages access to regression analysis program 122, which represents a physical or virtual resource. In some embodiments, regression analysis program 122 includes certain information and computer interface 124 represents program code that, when executed, enables computer system 120 to take specific action with respect to another physical resource and/or virtual resource based, at least in part on that certain information. In other words, in one such embodiment, computer interface 124 manages, at least in part, the ability of computer system 120 to take various actions with respect to one or more physical resources and/or virtual resources. In some embodiments, regression analysis program 122 controls physical and/or virtual resources and computer interface 124 manages the ability of computer system 120 to use and modify those resources. Regression analysis program 122 can also embody any combination of the aforementioned elements. To illustrate various aspects of the present invention, examples of regression analysis program 122 are presented in which regression analysis program 122 includes one or more of: a user profile transaction, a quality assurance profile, a multilayer perceptron neural network (MLP) request, and a linear profiling request, are presented, but embodiments of regression analysis program 122 are not limited thereto. Embodiments of the present invention recognize that regression analysis program 122 may include other forms of transactions that are known in the art.

In some embodiments of the present invention, regression analysis program 122 receives I/O data in the form of, i.e., is included as part of, a quality assurance profile (QA profile) from various other computer systems connected over network 110, but embodiments of regression analysis program 122 are not limited thereto. In various embodiments, the QA profile comprises one or more response variables and one or more explanatory variables. In some embodiments, the response variables represent I/O data that indicate a passing grade of the product and/or process in quality assurance. In addition to the response variables, the explanatory variables represent a plurality of explanatory features that identify underlying attributes to the one or more response variables. Further, the QA profile includes a description of the quality of the specified product and/or process, and the QA profile is characterized by the relationship of the one or more response variables and the one or more explanatory variables. In certain embodiments, computer interface 124 includes a user interface (UI) that provides a UI (e.g., a graphical interface (GUI)) to a user of computer system 120. In certain such embodiments, the UI of computer interface 124 receives I/O data from the user of computer system 120 and/or various other computer systems and enables the user to interact with regression analysis program 122 executing on computer system 120. In certain such embodiments, a UI of regression analysis program 122 enables the user to access and/or interact with computer system 120 and/or various computer systems through the authentication of the user via regression analysis program 122. In various embodiments, a UI of multilayer perceptron generator 126 enables the user to access and/or interact with computer system 120. In certain such embodiments, it is to be understood that computing environment 100 can include a plurality of computing devices without departing from the scope of the present invention.

In some embodiments depicted in FIG. 1, computer system 120 communicates with various computer systems (not shown) utilizing, at least in part, on regression analysis program 122. Regression analysis program 122 receives a QA profile from various computer systems, and generates an MLP request based, at least in part, but is not limited to, the I/O data received describing the QA profile, analyzing the I/O data received from the QA profile, extracting the one or more response variables and the one or more explanatory variables, and communicating the I/O data to multilayer perceptron generator 126. Multilayer perceptron generator 126 arranges the I/O data into neurons in a layered feedforward topology that represents explanatory variables in a QA profile of the multilayer perceptron neural network. The neurons form a biased weighted sum of the inputs from the QA profile which forms the basis, for at least, the activation function in the multilayer perceptron neural network. The neurons pass the inputs in the activation function through a transfer function to produce the output values. Multilayer perceptron generator 126 extracts the output values from the multilayer perceptron neural network using an interpretation form of the model of I/O data with weights and thresholds as the free parameters of the model, through forward propagation of the network.

In one embodiment, computer system 120 receives a QA profile from various computer systems and (i) proactively predicts upcoming changes in the QA profile and (ii) issues alerts, as needed, indicating changes in quality for a specified product and/or process that are below, meet, or exceed various thresholds for quality. Computer system 120 utilizes regression analysis program 122 to analyze the data received in the QA profile.

Regression analysis program 122 generates an MLP request using a neural network and arranges the data in neurons in a layered feedforward topology. In some embodiments, regression analysis program 122 monitors the neurons in the neural network, as each input connects to neurons between, at least, a first layer, one or more hidden layers, and a second layer. Additionally, the activation function of the neural network comprises, at least, a linear function and a non-linear function. One having ordinary skill in the art would understand that the activation function operates within the linear function and non-linear function. Additionally, one having ordinary skill in the art would understand that the multilayer perceptron neural network arranges input data into a plurality of neurons in the first layer of the neural network and arranges the output data of the first layer into the input of the second layer to create a fully connected neural network. Regression analysis program 122 receives output data with weights and thresholds describing the free parameters of the I/O data (e.g., I/O data included in a QA profile). One having ordinary skill in the art would understand that the weights and thresholds describing the free parameters of the I/O data represent the change in the explanatory variables from the input to the output of the MLP. Additionally, one having ordinary skill in the art would understand that the output data reflects the change in the response variables from the input to the output of the MLP.

In various embodiments, regression analysis program 122 includes a convolutional neural network (CNN), wherein, the CNN comprises I/O data, as well as multiple hidden layers of neurons (i.e., RELU layer). Regression analysis program 122 analyzes (i) the output data of the multilayer perceptron neural network (MLP) and (ii) the change in the explanatory variables output, at least in part. Regression analysis program 122 generates a linear and/or non-linear regression profile to create a best fit for the data based, at least in part, on the (i) the output data from the MLP and (ii) change in the explanatory variables from the MLP. Further, regression analysis program 122 determines which regression profile to utilize to determine whether an issue in QA is forecasted based, at least in part, on the change in the explanatory variables.

In one embodiment and example, regression analysis program 122 receives I/O data that represents at least a portion of a QA profile. Regression analysis program 122 identifies the one or more response variables and the one or more explanatory variables from the QA profile. Regression analysis program 122 communicates the identified (i) one or more response variables and (ii) the one or more explanatory variables from the QA profile to multilayer perceptron generator 126. Multilayer perceptron generator 126 arranges the I/O data into neurons in the first layer of the multilayer perceptron neural network based, at least in part, on the QA profile. The I/O data is then transformed through the activation function in the neural network, wherein, the weights and thresholds are connected from, at least, the first layer to a second layer. Embodiments of the present invention are not limited to the first layer and second layer, additionally, embodiments of the invention may contain a plurality of layers within the multilayer perception neural network. The MLP learns, within the perceptron, by changing the weights after each piece of data is processed, based on the amount of error in the output compared with the expected result. Further, the MLP generates a scaled numeric value based on the input, which is based, at least, on the (i) the response variables and (ii) the explanatory variables of the QA profile. The MLP applies word embedding (i.e. Word2vec) to transform a natural language term into one or more number variables. Additionally, the MLP applies binary coding to the one or more number variables to generate a plurality of scaled number variables. The scaled numeric variables represent the change in the explanatory variables as the output of the MLP. Regression analysis program 122 receives the scaled numeric variables (i.e., change in the explanatory variables) and analyzes the change in the data. Regression analysis program 122 determines whether to apply the data to a linear regression profile or a non-linear regression profile based, at least in part, on the change in the explanatory variables. Regression analysis program 122 monitors the regression profile generated by the output of the MLP. Regression analysis program 122 analyzes the data and determines whether based, at least in part, on the projection of the regression profile, whether an issue in quality assurance is forecasted. Regression analysis program 122 communicates an advisory alert to computer interface 124. Computer interface 124 issues an advisory alert to the user of computer system 120, if regression analysis program 122 determines that an issue in quality assurance is forecasted. Regression analysis program 122 stores the data from (i) the output of the MLP and (ii) the regression profile on database 128.

In various embodiments depicted in FIG. 1, multilayer perceptron generator 126 communicates the output data from the, at least, last layer of a neural network to regression analysis program 122. Regression analysis program 122 applies the output data to a regression profile to determine the probability (i.e., exceeds a threshold level) that a quality assurance issue will occur. As recognized below, regression analysis program 122 analyzes the regression profile based, at least in part, on (i) the slope of the graph, (ii) the quantity of outlying variables on the regression profile, and (iii) the concentration of variables in a recognized finite area on the regression profile (e.g., clustering analysis). In various embodiments depicted in FIG. 1, regression analysis program 122 generates a message (i.e., quality assurance alert) that includes, at least, a quality assurance evaluation based, at least, on the determination of the regression profile that the probability of a quality assurance issue will occur. Regression analysis program 122 communicates this message (i.e., quality assurance alert) to computer interface 124, wherein computer interface 124 displays this message to the user of computer system 120.

Figure 2:
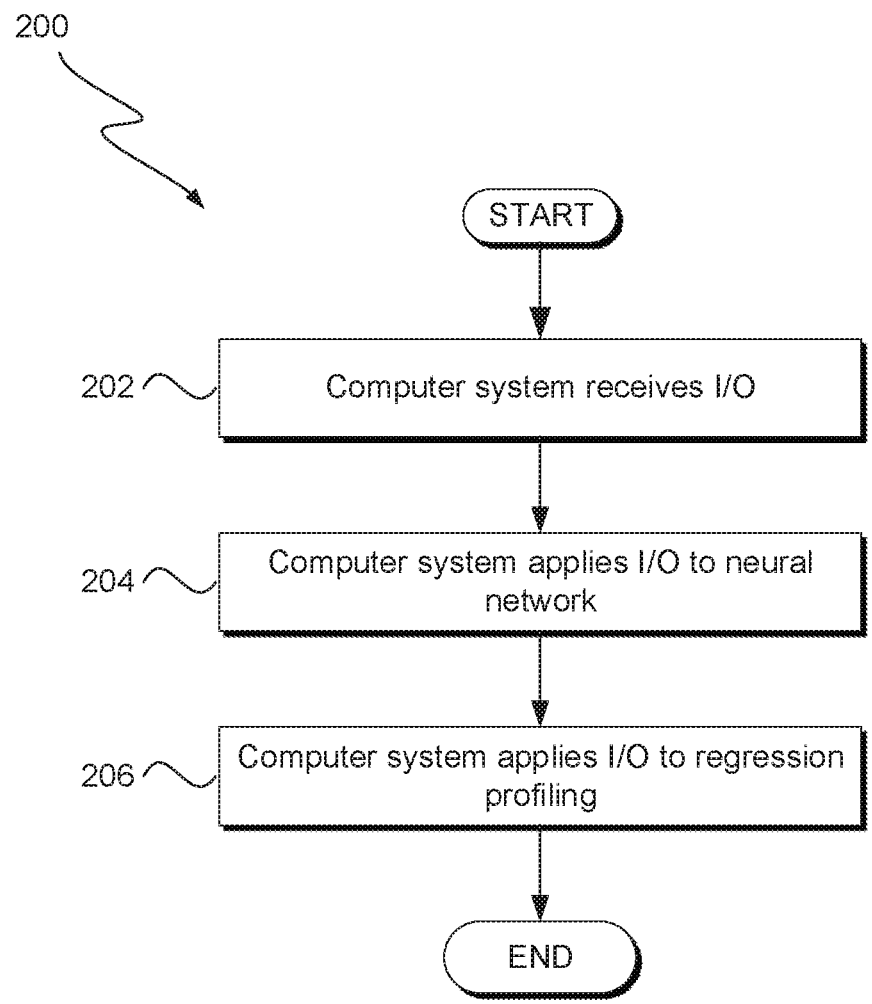
FIG. 2 illustrates operational processes of a neural network analyzing a quality assurance profile to generate a regression profile, on a computing device within the environment of FIG. 1, in accordance with an exemplary embodiment of the present invention.

FIG. 2 is a flowchart, 200, depicting operations of multilayer perceptron generator 126 in computing environment 100, in accordance with an illustrative embodiment of the present invention. FIG. 2 also represents certain interactions between multilayer perceptron generator 126. In some embodiments, the operations depicted in FIG. 2 incorporate the output of certain logical operations of regression analysis program 122 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series of operations depicted in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, multilayer perceptron generator 126, on computer system 120, receives I/O data (e.g., in a QA profile) from various computer systems (not shown) in computing environment 100. As recognized above multilayer perceptron generator 126 analyzes the QA profile and prepares the data to be populated into the MLP. Multilayer perceptron generator 126 communicates the QA profile to regression analysis program 122, which further analyzes the data. In one embodiment, regression analysis program 122 separates the data into two categories: (i) response variables and (ii) explanatory variables. In addition to the previous embodiment, regression analysis program 122 determines which response variables to arrange in the input values and which explanatory variables to arrange in the weight values. Regression analysis program 122 sends the results of the analysis to multilayer perceptron generator 126, which arranges the individual bits of data into neurons located on the MLP based, at least in part, on those results.

In operation 204, multilayer perceptron generator 126 arranges the data in the neurons of the multilayer perceptron layered feedforward topology neural network. Multilayer perceptron generator 126 connects the neurons of the first layer with neurons of, at least, one or more additional layers of neurons. Additionally, the one or more additional layers in the feedforward topology represent, at least, a distinct set of data based, at least, on the explanatory variables from the QA profile. The layers in the neural network function to provide deep learning abilities for regression analysis program 122 and are leveraged to identify a pattern of features in the, at least, explanatory variables. Furthermore, the output of the layers of the resulting MLP generates a threshold level of prediction that indicates when a quality issue will occur. One having ordinary skill the art would understand that a layered feedforward topology may include the outputs of each layer as an error measurement and the inputs of each layer are adjusted by a weight in the coefficients to perform a deep learn and identify the most important features of the data.

In one embodiment, multilayer perceptron generator 126 monitors the (i) inputs and outputs of the data in the layered feedforward topology and (ii) the weight level in the layered feedforward topology. In one embodiment, multilayer perceptron generator 126 communicates the (i) inputs and outputs of the data in the layered feedforward topology and (ii) the weight level in the layered feedforward topology to regression analysis program 122 along with program instructions to identify, based at least, on a threshold level, the most important features regarding the data in the layered feedforward topology. In some embodiments, regression analysis program 122 identifies the data in the layered feedforward topology that indicates the highest threshold level that a quality issue will occur. Multilayer perceptron generator 126 receives data and program instructions from regression analysis program 122 indicating the highest threshold level that a quality assurance issue will occur. Multilayer perceptron generator 126 retrieves the output data from the layered feedforward topology and communicates the data to regression analysis program 122, which, applies the data to a (i) linear regression or (ii) a non-linear regression.

In operation 206, multilayer perceptron generator 126 sends the final output data from the multilayer perceptron layered feedforward topology neural network to regression analysis program 122 along with instructions to regression analysis program 122 to apply the final output data to a regression profile In one embodiment, regression analysis program 122 analyzes the final output data from the multilayer perceptron layered feedforward topology and determines whether to apply the data to a linear or a non-linear regression profile. Additionally, regression analysis program 122 analyzes the final output data and identifies trends and/or patterns in the final output data indicating the change in the explanatory variables. Further, regression analysis program 122 identifies a threshold level in the change of the explanatory variables, that indicates an impact on subsequent quality assurance of the product and/or process. In one example, regression analysis program 122 analyzes the change in the explanatory variables and identifies that the differentiation between the expected and resulting explanatory variables is greater than ten percent. In this example, regression analysis program 122 determines that the ten percent change in the explanatory variables exceeds the threshold level. Regression analysis program 122 identifies the best-fit (i.e., linear or non-linear profiling) for the final output data and applies this data to a regression profile, as recognized below. Lastly, regression analysis program 122 analyzes the regression profile and determines whether based, at least, on the forecasted change in the explanatory variables, to communicate an alert to computer interface 124. Wherein, computer interface 124 issues an alert to the user of computer system 120.

Figure 3:
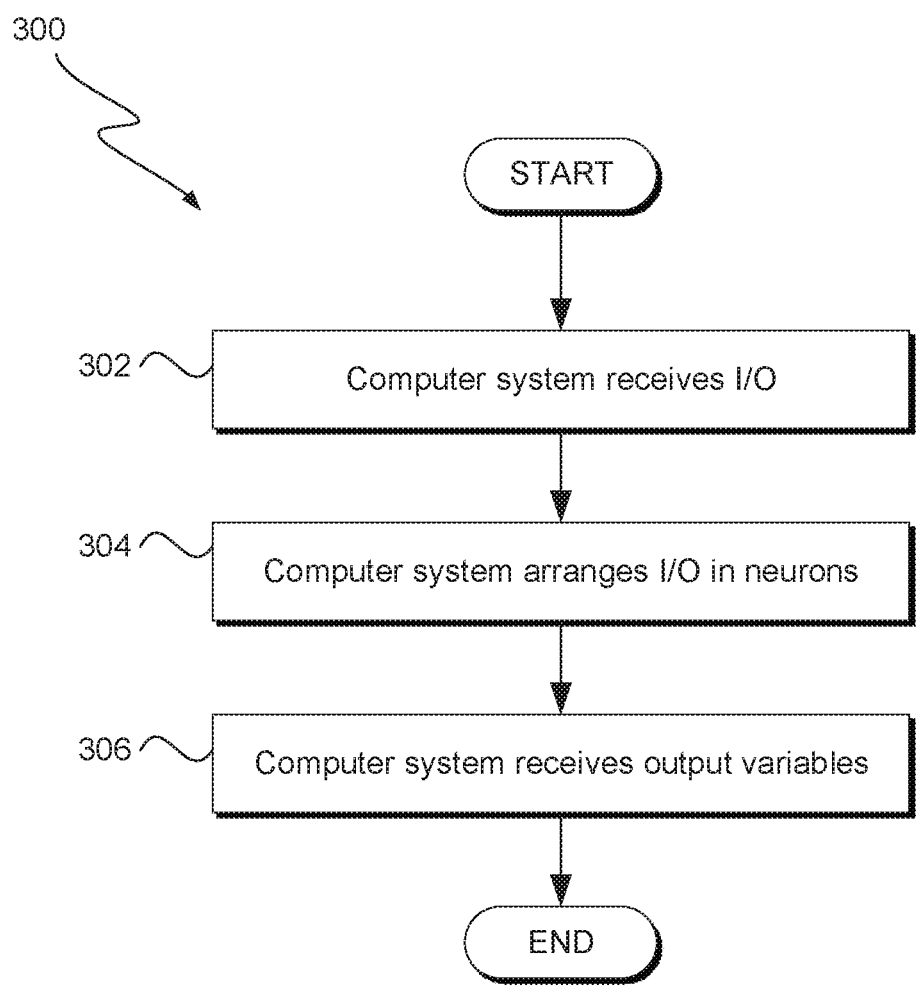
FIG. 3 illustrates operational processes of a computer system applying a quality assurance to a neural network, on a computing device within the environment of FIG. 1, in accordance with an exemplary embodiment of the present invention.

FIG. 3 is a flowchart depicting operations for generating, modifying, leveraging, and/or executing a multilayer perceptron neural network for computing environment 100, in accordance with an illustrative embodiment of the present invention. More specifically, in this embodiment, FIG. 3, depicts overall operations, 300, of multilayer perceptron generator 126 on computer system 120. In some embodiments, some or all of the operations depicted in FIG. 3 represent logical operations of regression analysis program 122 executing on computer system 120. It should be appreciated that FIG. 3 provides an illustration of one implementation and does not imply any limitations with regard to the environments in which different embodiments may be implemented. Many modifications to the depicted environment may be made. In one embodiment, the series of operations depicted in FIG. 3 can be performed in any order. In another embodiment, the series of operations, depicted in FIG. 3, can be performed simultaneously. Additionally, the series of operations, depicted in FIG. 3, can be terminated at any operation. In addition to the features previously mentioned, any operations, depicted in FIG. 3, can be resumed at any time.

In operation 302, multilayer perceptron generator 126 receives data, as recognized above, from various computer systems over network 110. The data may include (i) the one or more response variables and (ii) the one or more explanatory variables of the QA profile. Multilayer perceptron generator 126 analyzes the data and transmits the results of the analysis along with program instructions to regression analysis program 122 further analyze the data. In various embodiments, regression analysis program 122 can transmit a request to multilayer perceptron generator 126 for the data. In another embodiment, multilayer perceptron generator 126 can transmit the data at regularly scheduled intervals to regression analysis program 122. In one embodiment, regression analysis program 122 analyzes the data (i.e., response variables and the explanatory variables). Multilayer perceptron generator 126 receives a communication from regression analysis program 122 that includes the analyzed data, wherein, multilayer perceptron generator 126 prepares the analyzed data to be placed in the multilayer perceptron layered feedforward topology neural network.

In operation 304, multilayer perceptron generator 126 arranges the data in neurons located on the multilayer perceptron layered feedforward topology neural network. In various embodiments, multilayer perceptron generator 126 arranges the data in, at least, a first layer. The input data in the first layer of the MLP is weighted by explanatory variables of the QA profile. In an alternative embodiment, regression analysis program 122 arranges the data in neurons in, at least, a first layer of the multilayer perceptron layered feedforward topology neural network. As one having ordinary skill the art would understand, the MLP combines the input variables with one or more weighted sums, and the input variables are feed through the net input function and are summed. Multilayer perceptron generator 126 retrieves the net input function sum and communicates this data to regression analysis program 122. In one embodiment, regression analysis program 122 analyzes the net input function sum and determines whether based, on the value produced from the net input, if the input-weight variables should progress through another layer. In various embodiments, regression analysis program 122 determines that the input-weight variables should pass through, at least, one more layer. Multilayer perceptron generator 126 requests program instructions from regression analysis program 122 regarding whether the input-weight variables should pass through, at least, one more layer in the multilayer perceptron feedforward topology neural network. In various embodiments, regression analysis program 122 communicates program instructions to multilayer perceptron generator 126 to place the input-weight variables in, at least, one more layer in the multilayer perceptron feedforward topology neural network. In some embodiments, multilayer perceptron generator 126 prepares the input-weight variables and places this data into the neurons of the, at least, one more layer, wherein the input-weight variables traverse the same calculation, as mentioned above. Multilayer perceptron generator 126 retrieves the input-weight variables from the, at least, one more layer and communicates this data with program instructions to regression analysis program 122 to further analyze the input-weight variables (i.e., the data). In some embodiments, regression analysis program 122 determines that the input-weight variables from, at least, the first layer is sufficient and regression analysis program 122 stores the data on database 128. Additionally, multilayer perceptron generator 126 communicates with regression analysis program 122 and requests whether the input-weight variables are, at least, sufficient based, at least, on the determination operation of regression analysis program 122. The layers in the neural network function to provide deep learning abilities for regression analysis program 122 and are leveraged to identify a pattern of features in the, at least, explanatory variables.

In various embodiments as depicted in FIG. 3, multilayer perceptron generator 126 arranges data in neurons of the MLP and retrieves the one or more output variables as a method to deep learning and is leveraged to identify a pattern of features in the, at least, explanatory variables. In various embodiments, the MLP connects the output of each respective layer to a neuron of, at least, another layer to generate a depth of representations of the initial data arranged in the neurons of the first layer of the MLP. As one having ordinary skill in the art would understand, in certain embodiments, the deep-learning neural networks are configured and operate such that each layer in the MLP represents a distinct set of features based on the output of the previous layer. Additionally, one having ordinary skill in the art understands that as data advances further through the MLP, the ability of a given layer to recognize more complex features increases, resulting in modeling of almost arbitrary complexity through the addition of multiple hidden layers.

In operation 306, multilayer regression generator 126 retrieves the final output data of the, at least, last layer. The final output data is determined to be the output data from the last layer based, at least, on the determination of regression analysis program 122 that the input function value did not need to advance to another layer. In one embodiment, multilayer perceptron generator 126 communicates the final output data to regression analysis program 122, wherein regression analysis program 122 stores the final output data on database 128. In various embodiments, multilayer perceptron generator 126 communicates the final output data to regression analysis program 122, wherein regression analysis program 122 utilizes the final output data to generate a regression profile, as recognized below.

Figure 4:
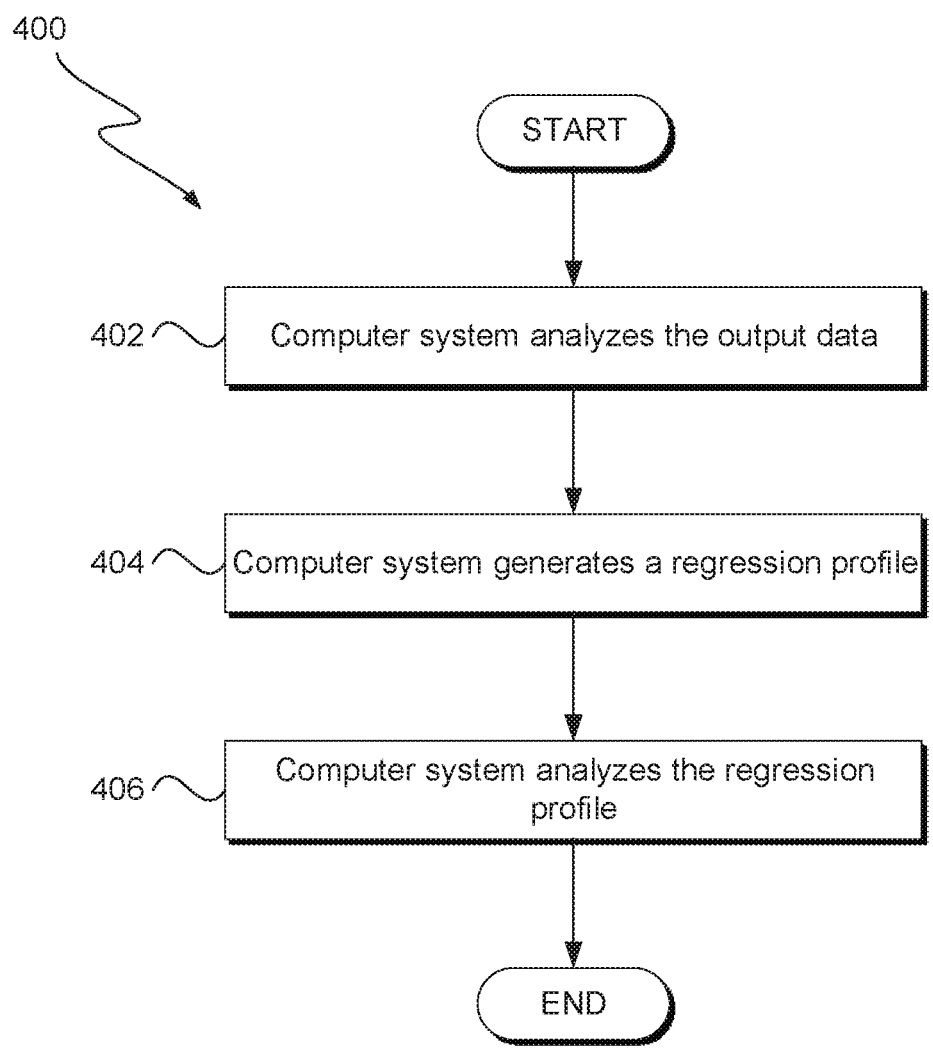
FIG. 4 illustrates operational processes of a computer system applying the data from a neural network to a regression profile, on a computing device within the environment of FIG. 1, in accordance with an exemplary embodiment of the present invention.

FIG. 4 is a flowchart depicting operations for executing a multilayer perceptron neural network for computing environment 100, in accordance with an illustrative embodiment of the present invention. More specifically, in one embodiment, FIG. 4, depicts overall operations, 400, of regression analysis program 122 executing on computer system 120. It should be appreciated that FIG. 4 provides an illustration of one implementation and does not imply any limitations with regard to the environments in which different embodiments may be implemented. Many modifications to the depicted environment may be made. In one embodiment of flowchart 400, the series of operations can be performed in any order. In another embodiment, the series of operations, shown in FIG. 4, can be performed simultaneously. Additionally, the series of operations, shown in FIG. 4, can be terminated at any operation. In addition to the features previously mentioned, any operations, shown in FIG. 4, can be resumed at any time.

In operation 402, regression analysis program 122 on computer system 120 receives the final output data from the MLP. In various embodiments, regression analysis program 122 analyzes the final output data from the MLP. Regression analysis program 122 identifies (i) the weighted response variables and (ii) the change in value in the explanatory variables. In some embodiments, regression analysis program 122 analyzes the change in value of the explanatory variables and identifies the forecasted impact on the quality assurance of the product and/or process. The change in value of the explanatory variables is based on, and typically reflects, the forecasted impact on the quality assurance of the product and/or process.

In operation 404, regression analysis program 122 analyzes the data from operation 402. In various embodiments, regression analysis program 122 determines that the final output data should be applied to a linear regression profile. Regression analysis program 122 inputs the final output data points into linear regression profile and generates a plot depicting a linear regression graph based, at least in part, on the forecasted change in the explanatory variables identified from the final output data, as recognized above. In some embodiments, regression analysis program 122 determines that the final output data should be applied to a non-linear regression profile. Regression analysis program 122 inputs the final output data points into a non-linear regression profile and generates a plot depicting a non-linear regression graph based, at least in part, on the forecasted change in the explanatory variables identified from the final output data, as recognized above.

In operation 406, regression analysis program 122 analyzes the regression profile generated in operation 404. In various embodiments, regression analysis program 122 analyzes the regression profile and identifies based, at least in part, on (i) the slope of the graph, (ii) the quantity of outlying variables on the regression profile, and (iii) the concentration of variables in a recognized finite area on the regression profile (e.g., clustering analysis), but these factors are not limited hereto, that a quality assurance issue is forecasted. In one example and embodiment, regression analysis program 122 analyzes the slope of the regression profile and identifies the slope of the regression profile based, at least in part, on the identification of the slope of the regression profile, regression analysis program 122 determines that the slope of the regression profile exceeds the recommended threshold level (i.e., that the slope exceeds the recommended slope by, at least, ten percent). Additionally, in this example and embodiment, based, at least in part on, regression analysis program 122 determining that the slope of the graph exceeds the recommended threshold level, regression analysis program 122 determines that a quality assurance issues is forecasted. In a second example and embodiment, regression analysis program 122 analyzes the regression profile and identifies that a clustering of variables in a finite area of the regression profile based, at least in part, on that clustering analysis regression analysis program 122 determines that a quality assurance issue is forecasted. Regression analysis program 122 generates a quality assurance alert and communicates this quality assurance alert with program instructions to computer interface 124 to display to the user of computer system 120. In one embodiment, computer interface 124 presents the quality assurance alert to the user on computer system 120. In some embodiments, regression analysis program 122 analyzes the regression profile and does not identify a quality assurance issue based, at least in part, on the slope of the graph.

In some embodiments depicted in FIG. 4, regression analysis program 122 continues to monitor the QA profile, and communicate the data to multilayer perceptron generator 126 apply the data from the QA profile to the MLP. In various embodiments, regression analysis program 122 generates a regression profile from the final output data of the MLP, as recognized above.

Figure 5:
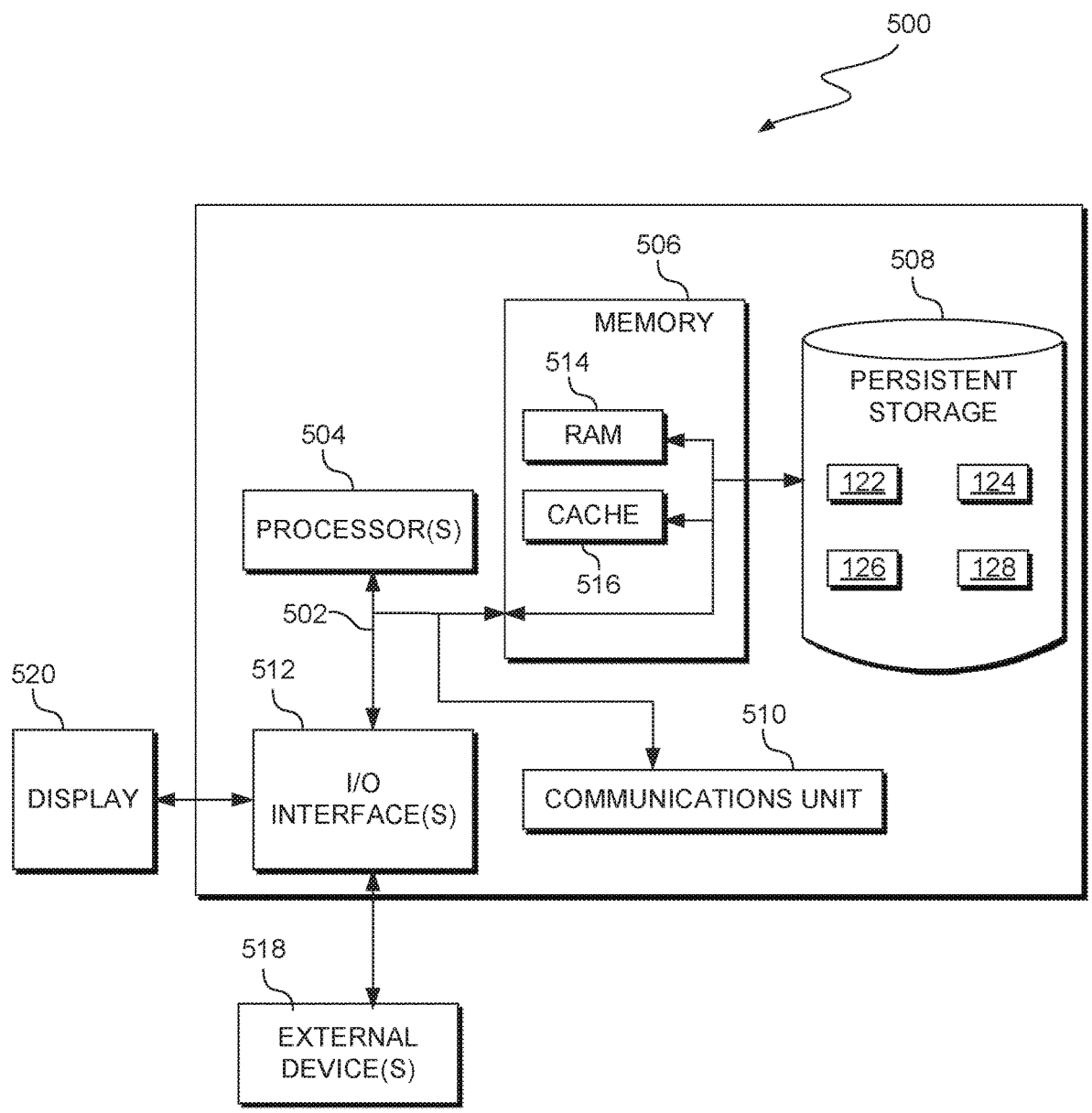
FIG. 5 depicts a block diagram of components of one or more computing devices within the computing environment depicted in FIG. 1, in accordance with an exemplary embodiment of the present invention.

FIG. 5 depicts a block diagram, 500, of components of computer system 120, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer system 120 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Regression analysis program 122, computer interface 124, multilayer perceptron generator 126, and database 128 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 110. In these examples, communications unit 510 includes one or more network interface cards. Communications unit 510 may provide communications through the use of either or both physical and wireless communications links. Regression analysis program 122, computer interface 124, multilayer perceptron generator 126, and database 128 may be downloaded to persistent storage 508 through communications unit 510.

I/O interface(s) 512 allows for input and output of data with other devices that may be connected to computer system 120. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., regression analysis program 122, computer interface 124, multilayer perceptron generator 126, and database 128, can be stored on such portable computer-readable storage media and can be loaded onto persistent storage 508 via I/O interface(s) 512. I/O interface(s) 512 also connect to a display 520.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method, the method comprising:
   analyzing, by one or more processors, a quality assurance profile, the quality assurance profile including one or more response variables and corresponding explanatory variables;
   arranging, by the one or more processors, data relating to the explanatory variables in neurons of, at least, a first layer of a neural network;
   determining, by the one or more processors, whether to apply a linear or non-linear regression profile to output data from the neural network based, at least in part, on a forecasted amount of change in the explanatory variables identified in the output data;
   generating, by the one or more processors, a regression profile based, at least in part, on the determination;
   forecasting, by the one or more processors, a quality assurance issue based on the regression profile when a slope of the regression profile exceeds a recommended threshold level, a quantity of outlying variables is on the regression profile and a concentration of explanatory variables are within a finite area of the regression profile;
   applying, by the one or more processors, the output data to the generated regression profile to determine a probability that the quality assurance issue will occur; and
   generating, by the one or more processors, a message that includes a quality assurance evaluation based, at least, on the determined probability that the quality assurance issue will occur before the quality assurance issue being predicted becomes an actual quality assurance issue.

2. The method of claim 1, the method further comprising:
   assigning, by one or more processors, a weight level to one or more neurons of the neural network based, at least in part, on the corresponding explanatory variables of the one or more response variables.

3. The method of claim 1, the method further comprising:
   analyzing, by one or more processors, net input data in one or more neurons, at least, in the first layer of the neural network;
   determining, by one or more processors, that input-weight variables from the net input data should pass through, at least, one more layer of the neural network; and
   applying, by one or more processors, the input-weight variables to, at least, one more layer of the neural network.

4. The method of claim 1, the method further comprising:
   identifying, by one or more processors, a plurality of features based, at least in part, on data from the quality assurance profile;
   learning, by one or more processors, a pattern associated with, at least, the plurality of features; and
   generating, by one or more processors, a threshold level of prediction that the quality assurance issue will occur based, at least in part, on the learned pattern.

5. The method of claim 1, wherein applying the output data to the generated regression profile to determine the probability that the quality assurance issue will occur includes generating a plot depicting a graph based, at least in part, on the forecasted amount of change in the explanatory variables and the generated regression profile.

6. The method of claim 5, wherein the determined probability that the quality assurance issue will occur is based, at least in part, on a slope of the graph.

7. The method of claim 1, wherein the determined probability that the quality assurance issue will occur is based, at least in part, on a quantity of outlying variables on the regression profile.

8. The method of claim 1, wherein the determined probability that the quality assurance issue will occur is based, at least in part, on a concentration of variables in a recognized finite area on the regression profile.

9. The method of claim 3, the method further comprising:
feeding, by one or more processors, the input-weight variables through a net input function and summing the results.

10. The method of claim 9, wherein determining that the input-weight variables from the net input data should pass through, at least, one more layer of the neural network is based, at least in part, on the summed results.

11. A computer program product, the computer program product comprising:
one or more computer-readable storage media and program instructions stored on the one or more computer-readable storage media, the stored program instructions comprising:
program instructions to analyze a quality assurance profile, the quality assurance profile including one or more response variables and corresponding explanatory variables;
program instructions to arrange data relating to the explanatory variables in neurons of, at least, a first layer of a neural network;
program instructions to determine whether to apply a linear or non-linear regression profile to output data from the neural network based, at least in part, on a forecasted amount of change in the explanatory variables identified in the output data;
program instructions to generate a regression profile based, at least in part, on the determination;
program instructions to forecast a quality assurance issue based on the regression profile when a slope of the regression profile exceeds a recommended threshold level, a quantity of outlying variables is on the regression profile and a concentration of explanatory variables are within a finite area of the regression profile;
program instructions to apply the output data to the generated regression profile to determine a probability that the quality assurance issue will occur; and
program instructions to generate a message that includes a quality assurance evaluation based, at least, on the determined probability that the quality assurance issue will occur before the quality assurance issue being predicted becomes an actual quality assurance issue.

12. The computer program product of claim 11, the stored program instructions further comprising:
program instructions to assign a weight level to one or more neurons of the neural network based, at least in part, on the corresponding explanatory variables of the one or more response variables.

13. The computer program product of claim 11, the stored program instructions further comprising:
program instructions to analyze net input function data in one or more neurons, at least, in the first layer of the neural network;
program instructions to determine that input-weight variables from the net input data should pass through, at least, one more layer of the neural network; and
program instructions to apply the input-weight variables to, at least, one more layer of the neural network.

14. The computer program product of claim 11, the stored program instructions further comprising:
program instructions to identify a plurality of features based, at least in part, on data from the quality assurance profile;
program instructions to learn a pattern associated with, at least, the plurality of features; and
program instructions to generate a threshold level of prediction that the quality assurance issue will occur based, at least in part, on the learned pattern.

15. A computer system, the computer system comprising:
one or more computer processors;
one or more computer readable storage medium; and
program instructions stored on the computer readable storage medium for execution by at least one of the one or more processors, the stored program instructions comprising:
program instructions to analyze a quality assurance profile, the quality assurance profile including one or more response variables and corresponding explanatory variables;
program instructions to arrange data relating to the explanatory variables in neurons of, at least, a first layer of a neural network;
program instructions to determine whether to apply a linear or non-linear regression profile to output data from the neural network based, at least in part, on a forecasted amount of change in the explanatory variables identified in the output data;
program instructions to generate a regression profile based, at least in part, on the determination;
program instructions to forecast a quality assurance issue based on the regression profile when a slope of the regression profile exceeds a recommended threshold level, a quantity of outlying variables is on the regression profile and a concentration of explanatory variables are within a finite area of the regression profile;
program instructions to apply the output data to the generated regression profile to determine a probability that a quality assurance issue will occur; and
program instructions to generate a message that includes a quality assurance evaluation based, at least, on the determined probability that the quality assurance issue will occur before the quality assurance issue being predicted becomes an actual quality assurance issue.

16. The computer system of claim 15, the stored program instructions further comprising:
program instructions to assign a weight level to one or more neurons of the neural network based, at least in part, on the corresponding explanatory variables of the one or more response variables.

17. The computer system of claim 15, the stored program instructions further comprising:
program instructions to identify a plurality of features based, at least in part, on data from the quality assurance profile;
program instructions to learn a pattern associated with, at least, the plurality of features; and
program instructions to generate a threshold level of prediction that the quality assurance issue will occur based, at least in part, on the learned pattern.

* * * * *